United States Patent [19]

Kodama et al.

[11] Patent Number: 4,649,421
[45] Date of Patent: Mar. 10, 1987

[54] CIRCUIT FOR GENERATING A SIGNAL FOR CORRECTING REGISTRATION IN A COLOR TELEVISION CAMERA WITH REDUCTION IN GENERATION OF SHADING

[75] Inventors: Takuma Kodama, Kokubunji; Kenji Takahashi, Shiroyama; Shizuka Ishibashi, Musashimurayama; Koji Kudo, Hashiouji; Yukihiro Masuda, Kodaira; Masanori Hombough, Mitaka; Osamu Miyoshi; Kazuhisa Yoshiwara, both of Kodaira, all of Japan

[73] Assignees: Hitachi, Ltd., Tokyo; Hitachi Denshi Kabushiki Kaisha, Kanagawa; Hitachi Video Engineering Inc., all of Japan

[21] Appl. No.: 666,035

[22] Filed: Oct. 29, 1984

[30] Foreign Application Priority Data

Nov. 2, 1983 [JP] Japan .................................. 58-204844

[51] Int. Cl.⁴ ........... H04N 9/093; H04N 3/23/5/228; H01J 29/56
[52] U.S. Cl. ..................................... 358/51; 358/163; 358/217; 315/371
[58] Field of Search ........................ 358/51, 163, 217; 315/370, 371

[56] References Cited

U.S. PATENT DOCUMENTS

4,549,117 10/1985 Takamashi et al. .................. 315/371

Primary Examiner—James J. Groody
Assistant Examiner—Randall S. Svihla
Attorney, Agent, or Firm—Antonelli, Terry & Wands

[57] ABSTRACT

A digital registration circuit for a multi-tube television camera wherein correction quantities corresponding to positions on a target of an image pickup tube are stored in a digital memory. The digital signal for the correction quantity read out from the digital memory is converted into an analog signal which is supplied to a low-pass filter and smoothed. The smoothed signal is sampled at a sampling frequency higher than the frequency at which the correction quantities stored in the digital memory are read out and the sampled signal is converted into a digital signal. The digital signals sequentially produced are applied to a shift register, and four sequential sample values supplied from the shift register are added together in an adder. The shift register operates in such a manner that four samples are shifted one by one every adding time. An output signal from the adder is used for correcting registration, so that the generation of shading can be prevented.

18 Claims, 19 Drawing Figures

| $X_1Y_1$ | $X_2Y_1$ | $X_3Y_1$ | $X_4Y_1$ | $X_5Y_1$ | $X_6Y_1$ | $X_7Y_1$ |
|---|---|---|---|---|---|---|
| $X_1Y_2$ | $X_2Y_2$ | $X_3Y_2$ | $X_4Y_2$ | $X_5Y_2$ | $X_6Y_2$ | $X_7Y_2$ |
| | | | | | | |
| $X_1Y_{480}$ | $X_2Y_{480}$ | $X_3Y_{480}$ | $X_4Y_{480}$ | $X_5Y_{480}$ | $X_6Y_{480}$ | $X_7Y_{480}$ |

CIRCUIT FOR GENERATING A SIGNAL FOR CORRECTING REGISTRATION IN A COLOR TELEVISION CAMERA WITH REDUCTION IN GENERATION OF SHADING

BACKGROUND OF THE INVENTION

This invention relates to a television camera, and in particular to a registration circuit suitable for a television camera, such as a three-tube color television camera in which a plurality of image pickup tubes are used.

Figure 1:
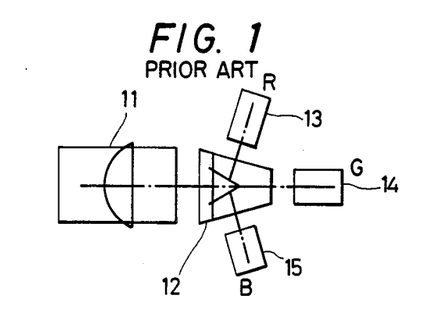
FIG. 1 is a schematic illustration of the principle of a three-tube color television camera.

A conventional three-tube color television camera is provided with three image pickup tubes corresponding to the three primary colors red (R), green (G), and blue (B), and is used in television broadcasting and for applications where high image quality is required. FIG. 1 shows an arrangement comprising a receiving lens system 11, an optical system for separating colors 12, and image pickup tubes 13, 14, 15 corresponding to the primary colors R, G and B, in which a television signal is finally prepared from outputs of the image pickup tubes 13, 14, 15 which have passed through a signal amplification process. In a multi-tube color television camera such as a three-tube camera, various geometric distortions are produced as a result of tolerance errors in the manufacture of the electron guns and deflection coil assemblies, as well as electrooptical distortions attributable to these errors and which are peculiar to the deflection system being used. For this reason, the images must be superimposed after the geometric distortion in each image pickup tube has been corrected. This process of superimposing images is called registration.

Figure 2:
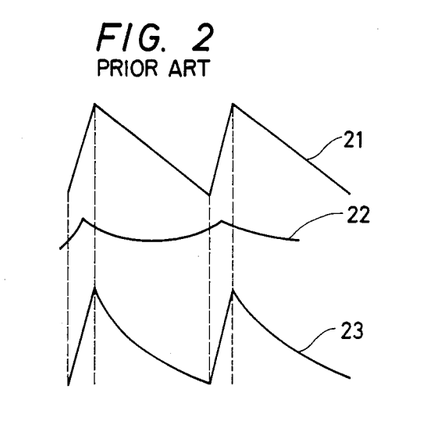
FIG. 2 shows an example of a waveform conventionally employed for correcting the deflecting current in a television camera.

In order to effect registration, deflection coils and image pickup tubes which tend to exhibit the same distortion are selected and used in combination. In addition, as shown in FIG. 2, adjustment of the registration is done by superimposing a correction waveform 22 such as a parabolic waveform on a deflecting current (or voltage) waveform 21. FIG. 2 illustrates an example of the deflecting current (voltage) waveform 21 and a parabolic waveform used as an example of the correction waveform 22. Numeral 23 denotes the deflection current (voltage) waveform obtained by superimposing the parabolic correction waveform 22 on the waveform 21.

Figure 3:
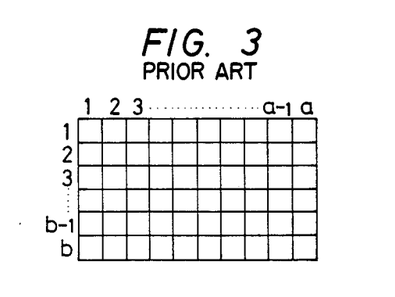
FIG. 3 illustrates the general concept of dividing up a television screen for correcting digital registration.

With the recent introduction of high-definition television cameras, a demand has risen for highly-accurate registration adjustment. However, the problem is that the above approach is not suitable for correcting high-order distortion. In order to correct low-order to high-order distortions, a digital registration system has been developed in which a digital memory is used to store the correction waveform to provide highly-accurate correction. The digital registration system is, as shown in FIG. 3, designed to provide registration adjustment on a section basis by dividing the television screen (the scanning area of the target in an image pickup tube) into a divisions in the horizontal direction and b divisions in the vertical direction. A digital registration system has been disclosed in, for instance, Japanese Patent Application Laid-Open No. 2166/1982.

Figure 5:
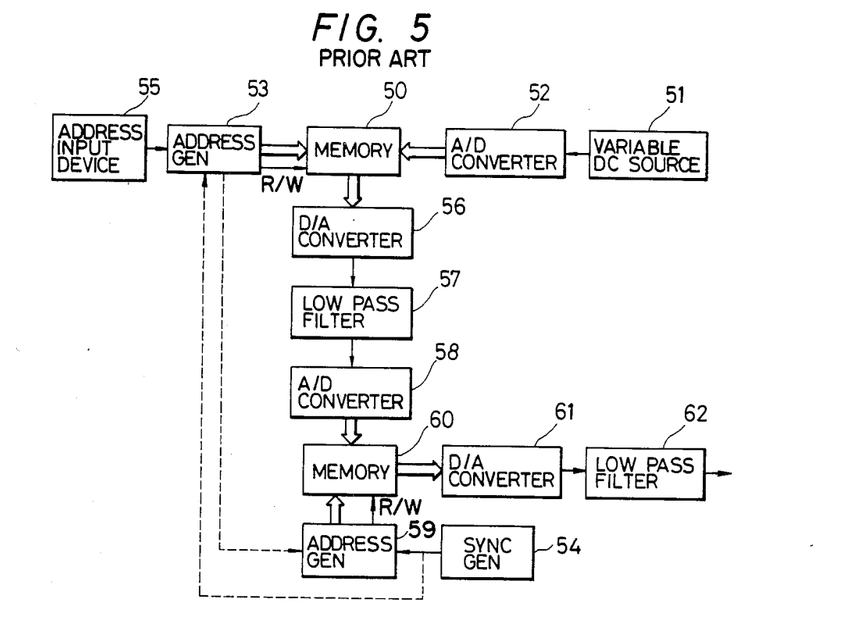
FIG. 5 is a block diagram of the digital registration circuit proposed in pending U.S. application Ser. No. 578,208.

An example of such a digital registration system is proposed in the pending U.S. application Ser. No. 578,208, filed on Feb. 8, 1984, now U.S. Pat. No. 4,549,117, and is shown in FIG. 5. The circuit of FIG. 5 will be described below.

Figure 4:
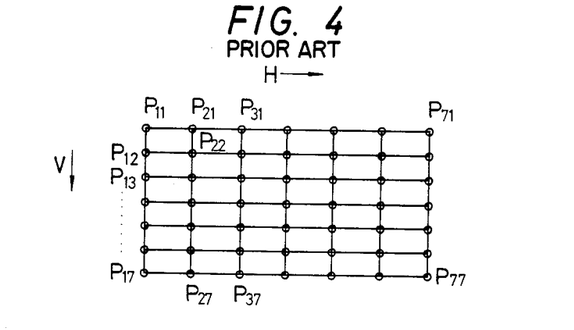
FIG. 4 illustrates a memory map of a memory used for correcting digital registration.

It is assumed that the screen is divided into regions 6 (horizontally)×6 (vertically), as shown in FIG. 4. A plurality of horizontal and vertical lines are used to divide the screen into a plurality of regions, but this does not mean that these lines are actually present on the screen; they are imaginary lines used to illustrate the fact that values providing distortion correction are given for each position indicated by intersections thereof.

Figure 6A:
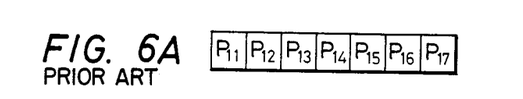
FIGS. 6A through 6C illustrate the sequence of reading out data from the circuit of FIG. 5, and waveforms thereof.
Figure 6B:
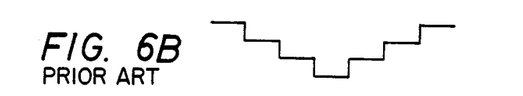
Figure 6C:
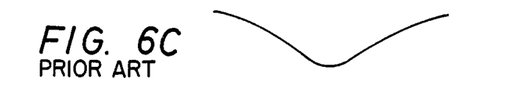
Figure 7:
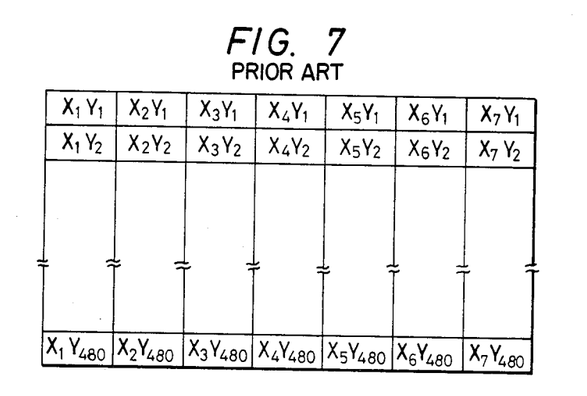
FIG. 7 illustrates a memory map of the second memory in the circuit of FIG. 5.

The distortion-correction value at each intersection is stored in a memory as digital data. The total number of correction data items, including those for the periphery, is $7 \times 7 = 49$. The address of each data item is represented by P (H, V). FIG. 5 is a block diagram of the digital registration system, whose operation will now be described. When inputting data, the operator selects an address P (H, V) for the registration correction using an address input device 55, and then sets the distortion-correction value for the specified address using a variable DC source 51. The output voltage of the variable DC source 51 is converted into digital data by an analog-to-digital converter (A/D converter) 52 and applied to an input port of a first memory 50. An output of the address input device 55 is applied to an address generator 53, and an output of the address generator 53 is applied to an address terminal of the first memory 50. The output of the address generator 53 is provided in the form of a digital code. If a read/write (R/W) control terminal of the first memory 50 is in a write mode during this time, the digital data converted by the A/D converter 52 will be stored at the specified address in the memory 50. If this operation is repeated a number of times corresponding to the number of sections obtained by dividing up the screen, all the distortion-correction data corresponding to the positions on the screen can be written into the memory 50. The contents of the memory 50, i.e. the data for each intersection of FIG. 4, are read out in the vertical direction. The data arrangement of FIG. 4 is assumed to correspond to the positional relationship on the screen. In other words, data in the column $P_{11}$, $P_{12} \ldots P_{17}$ is first read out, as shown in FIG. 6A, and then $P_{21}, P_{22} \ldots P_{27}$ are read out. The data train read out in the vertical direction is converted into analog quantities by a digital-to-analog converter (D/A converter) 56, and the waveform of the analog output of the D/A converter 56 is shown in FIG. 6B, which shows an example of correction data. Since the analog output contains harmonic wave components, to smooth it, it is passed through a low-pass filter (LPF) 57 which has a suitable cutoff frequency and degree of smoothing to completely attenuate the harmonic wave components, and thus the smooth waveform shown in FIG. 6C is obtained. The output of the LPF 57 is again converted into digital data by an analog-to-digital converter (A/D converter) 58. The output from the A/D converter 58 is written sequentially into a second memory 60. Interpolation data which has been smoothed in the vertical direction, based on the data in the first memory 50, is thus obtained for each scanning line and stored in the second memory 60. If this operation is repeated for columns $P_{21}, P_{31} \ldots P_{71}$, interpolation data covering the whole screen in the vertical direction is stored in the second memory 60. After all the data has been stored in the second memory 60, a synchronizing signal from a sync signal generator 54 is applied to the address generator 59, and addresses synchronized with the synchronizing signal are generated and input to the second memory 60 so that interpolation data synchronized with the television scanning can be read out from the second memory 60. FIG. 7 shows a memory chart based on the assumption that the number of vertical effective scanning lines (one field) is 480. In FIG. 7, if data is read out in the sequence $X_1Y_1, X_2Y_1 \ldots X_7Y_1$ along the first scanning line followed by $X_1Y_2, X_2Y_2 \ldots X_7Y_2$ along the second scanning line in the horizontal direction, and is again converted into analog quantities by a D/A converter 61, the waveforms which have been interpolated in the vertical direction can be obtained. The interpolation in the horizontal direction is enabled by simply passing the data through an LPF 62, since the data read out of the memory 60 is sequentially arranged in a time series in the horizontal direction.

The inventors of the present application have tested the operation of the digital registration system of FIG. 5 in practice, and have found that, if the number of quantization bits is small when interpolation data is quantized, shading (luminance non-uniformity) due to quantization errors occurs.

The inventors have examined the reasons for the generation of shading.

Figure 8:
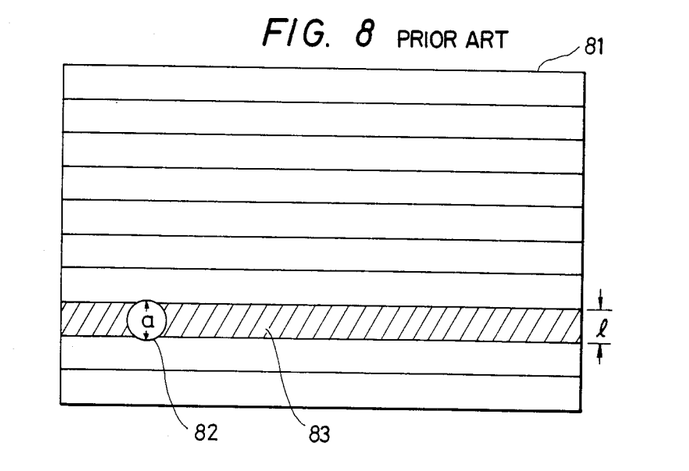
FIG. 8 illustrates a photoconductive target subjected to electron beam scanning.

The reasons for the generation of shading will be described first. FIG. 8 shows a photoconductive target of a image pickup tube. In FIG. 8, it is assumed that an electron beam 82 is scanning the photoconductive target 81 of the image pickup tube from left to right in the horizontal direction. A hatched portion 83 represents a region in which a charge is discharged by the electron beam 82 as a scanning line is scanned. To simplify the description, the electron beam 82 is assumed to be circular. With an image pickup tube which is one inch or ⅔ inch wide, the diameter a of the electron beam 82 is normally greater than the scanning width l. Accordingly, interlace scanning enables all the charges in one field of the scanned surface to be read out. An output current Is corresponding to the charge read out during time is given by:

$$Is = dQ/dt \quad (1)$$

where Q is the total quantity of charge stored on the photoconductive target. Assuming that light is radiated uniformly onto the photoconductive target, the charge read out per unit time will be:

$$dQ = l \cdot v \cdot Q_0 \cdot dt \quad (2)$$

If (2) is substituted into (1):

$$Is = l \cdot v \cdot Q_0 \quad (3)$$

where v is the beam speed and $Q_0$ is the charge per unit area. From (3), the output signal taken out of the photoconductive target is proportional to l and v, when $Q_0$ is constant. The effect of the distortion-correction waveform on the output signal current when registration is effected will now be considered. If the displacement of the beam is assumed to be proportional to the correction waveform superimposed on the deflecting current waveform, the change in the output signal with respect to time due to the correction waveform, that is, the quantity of shading is given by:

$$dIs/dt = Q_0 v dl/dt + Q_0 l dv/dt \quad (4)$$

Figure 9A:
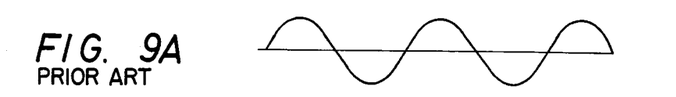
FIGS. 9A through 9E illustrate two different distortion-correcting waveforms and their differentiated waveforms, and the density of scanning lines in electron beam deflection due to the distortion-correction waveform.
Figure 9B:
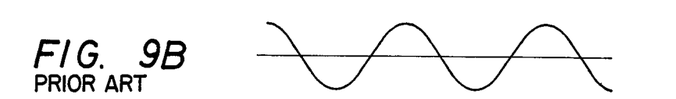

From (4), the quantity of shading can be seen to be proportional to the derivative of the correction waveform. If the distortion-correction waveform is a sine wave, as shown in FIG. 9A, the waveform obtained by differentiating that wave will be a cosine wave (FIG. 9B), which presents no problem because the density of the scanning lines drawn by the electron beam will change smoothly.

Figure 9C:
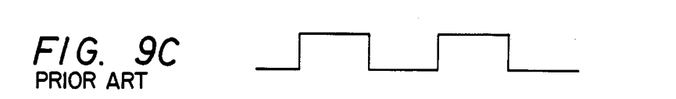
Figure 9D:
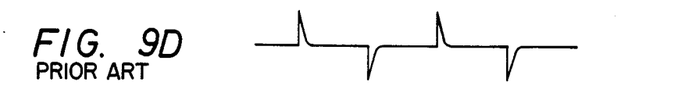
Figure 9E:
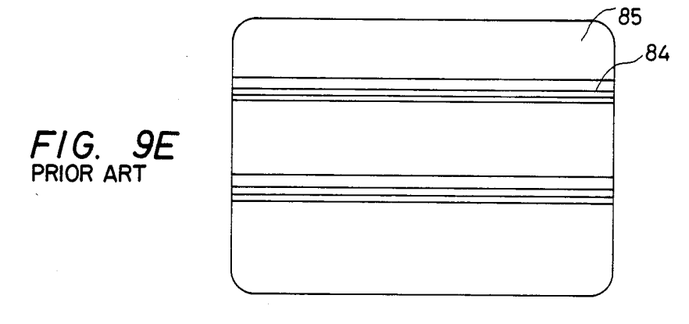

However, if the distortion-correction waveform is a square wave, as shown in FIG. 9C, the differentiated waveform will be as shown in FIG. 9D, and the density of the scanning lines will vary sharply. As shown in FIG. 9E, the result is densely- and loosely-distributed scanning lines 84 and 85. The output current $I_s$ increases at the portion 85 of low scanning-line density and decreases at the portion 84 of high scanning-line density. According to these variations of the output current $I_s$, the brightness on a monitor screen becomes bright at a portion corresponding to the portion 85 and becomes dark at a portion corresponding to the portion 84. Thus, shading is produced. FIG. 9E shows shading in the form of an image.

The problems of the digital registration circuit of FIG. 5 will now be described with reference to FIGS. 5 and 10.

Figure 10:
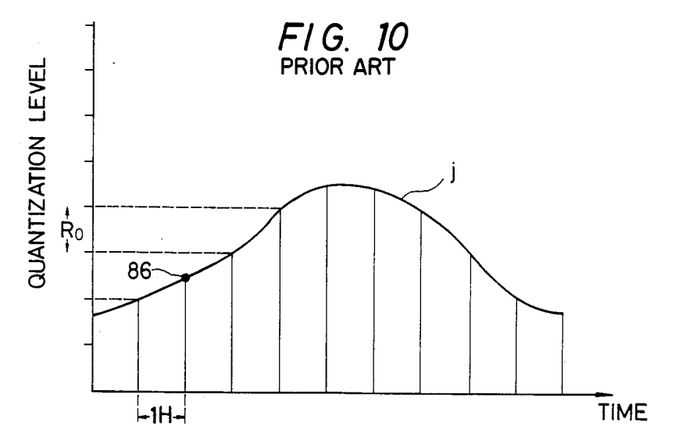
FIG. 10 illustrates the quantization of an analog signal and quantization errors.

In FIG. 5, the output of the D/A converter 56 passes through the low-pass filter 57, and becomes the analog signal shown in FIG. 10. The abscissa in FIG. 10 indicates the sampling cycle and the ordinate the signal level. The analog signal is converted into a digital signal by the A/D converter 58. The sampling cycle during this time is one horizontal scanning period (1H).

In this case, the analog signal level is uniformly divided and quantized. A quantization step (quantization increment) is to be assumed $R_0$. Analog quantities between these steps, such as a point 86 in FIG. 10, are rounded off to the nearest whole number with $R_0/2$ acting as a threshold, so that the difference $R_0/2$ becomes the quantization error. The quantization error depends on the number of bits n in the digitization of the A/D converter 58. In other words, if the number of quantization steps is N, $N = 2^n$.

The number of bits n of the A/D converter must be increased to obtain a distortion-correction waveform with less quantization error, a smoother waveform, i.e., a correction waveform free from sharp changes in the density of the scanning lines such as that passed through the low-pass filter 57.

An 8-bit A/D converter 58 was used to conduct experiments on the digital registration system of FIG. 5, and it was found that shading was still obvious on the screen.

The number of bits of the A/D converter 58 must therefore be larger than 8 to solve the shading problem. However, high-speed, 12-bit A/D converters are still very expensive.

SUMMARY OF THE INVENTION

An object of the present invention is thus to provide a digital registration system which is capable of reducing the generation of shading on a screen.

This object can be achieved by a circuit for generating a signal for correcting the registration in a color television camera according to the present invention, in which the correction quantities read out from memory are converted from digital to analog signal form, the resulting analog signal is smoothed in a low pass filter circuit and the output signal of the smoothing circuit is sampled to produce digital sample values; however, instead of directly storing these digital sample values for use in correcting registration, as done in the prior art, a predetermined number of the digital sample values are added to produce a mean value as the sample values are added to produce a mean value as the sample values are shifted through the stages of a shift register, and the resultant added value is stored. Since the adding of sample values produces an output representing the mean value of a predetermined number of sequential samples, with each successive group of added sample values changing by one sample value, the added value which is stored in memory does not change abruptly with time, but changes smoothly, thereby effectively reducing the generation of shading.

DETAILED DESCRIPTION OF PREFERRED EMBODIMENT

Figure 11:
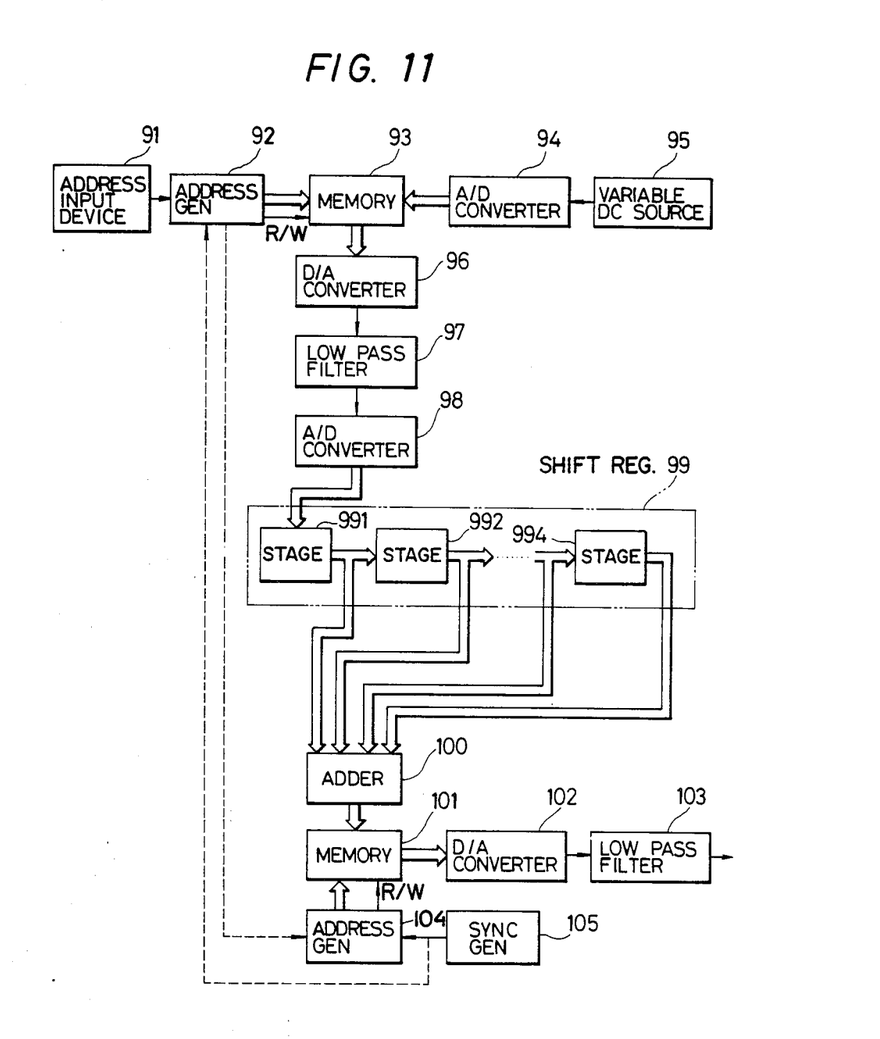
FIG. 11 is a block diagram of an embodiment of the present invention.

Referring to FIG. 11, an embodiment of the present invention will now be described. FIG. 11 shows an arrangement comprising an address input device 91, an address generator 92, a first memory 93, an A/D converter 94, a variable DC source 95, a D/A converter 96, a low-pass filter (LPF) 97, and an A/D converter 98.

After an address is designated in order to obtain data for correcting registration, a correction quantity is set for that address, and then the data is stored in the first memory 93, the data is read out in the vertical direction and is converted into an analog signal by the D/A converter 96, and is then passed through the LPF 97 for smoothing and is converted into digital data. The process as far as this stage is the same as in the circuit of FIG. 5, so a detailed description thereof is omitted.

Figure 12A:
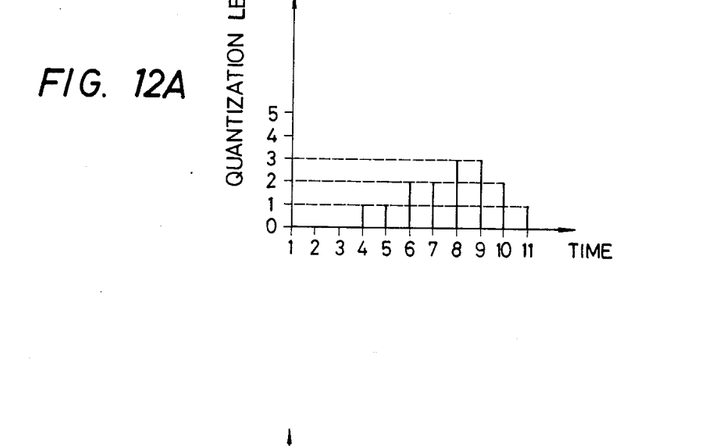
FIG. 12A illustrates the outputs of the A/D converter of the embodiment of FIG. 11.

The output of the A/D converter 98 is input to a multi-stage shift register 99. The data for correcting the registration is assumed to have been digitalized into 8-bit quantities, but for reasons stated above, the number of bits used for the correction data must be increased further. According to the present invention, the output of the A/D converter 98 is input to the first stage 991 of the shift register 99, and the output of each shift register stage is input to an adder 100, to increase the number of bits. To keep the description brief, the number of bits is assumed to be increased by two bits. The output of the A/D converter 98 is converted into a digital quantity, as shown in FIG. 12A in which time and the quantization level are shown along the abscissa and ordinate, respectively. In the circuit of FIG. 5, the output data of the A/D converter 58 are stored in the memory 60 as 8-bit data, because the outut of the A/D converter 58 is directly applied to the memory 60.

On the other hand, if the output of the A/D converter 98 is passed through $2^2 = 4$ shift register stages, four digital data items of the output can be sequentially shifted and added, so that the number of bits can be increased by two.

When the number of bits is to be increased by two, the shift register 99 consists of four shift register stages 991, 992 ... 994 connected in series. Each of these register stages has an eight-bit capacity with parallel input and parallel output of the eight bits. The data sequentially output from the A/D converter 98 is shifted within the four shift register stages connected in series.

The outputs of the four shift register stages are input in parallel to the adder 100 every time the data is shifted one data item equivalent. The four data items output from the four shift register stages represent four sample values sequentially sampled by the A/D converter 98. As a result, the adder 100 sequentially outputs quantities equivalent to the sums of four sequential samples shifted one by one.

The addition of the four sample values means the provision of a mean value thereof. Since the adder sequentially outputs data representing the mean values of four sequential samples, each group being different by one sample, the output of the adder does not change rapidly with time, but smoothly.

According to the present invention, the output of the adder 100 is used as a distortion-correction value. Since the output of the adder 100 changes smoothly, a distortion-correction waveform which changes smoothly along with that output can be obtained. The density of the scanning lines also changes smoothly because of the distortion-correction waveform, and shading is thus prevented.

For instance, if four data items (1, 2, 3, 4) along the time axis of FIG. 12A are added, the result will be $(0+0+0+1=1)$. Subsequently, if (2, 3, 4, 5) are added, the result will be $(0+0+1+1=2)$, and similarly if (3, 4, 5, 6) are added, the result will be $(0+1+1+2=4)$. If the output of each shift register stage is added up in this way, the output of the adder 100 has a waveform as shown in FIG. 12B, so that the output waveform of the D/A converter 102 is that of FIG. 12B, the number of quantization steps is increased when compared with FIGS. 12A, and an increase in the number of bits is achieved.

In this embodiment, the output of the adder 100 is a 10-bit digital signal. Therefore the second memory 101 storing the signal and the D/A converter 102 converting the signal read out of the second memory into an analog signal must also be able to handle 10-bit data.

Although reference has been made to the case of a two-bit increase, the same principle can be applied for a four-bit increase. However, with a four-bit increase, $2^4=16$ shift register stages are required. The data for correcting the registration is digitized into 12-bit data by the output of the adder 100, and therefore the second memory 101 and the D/A converter 102 must be able to handle 12-bit data.

Figure 12B:
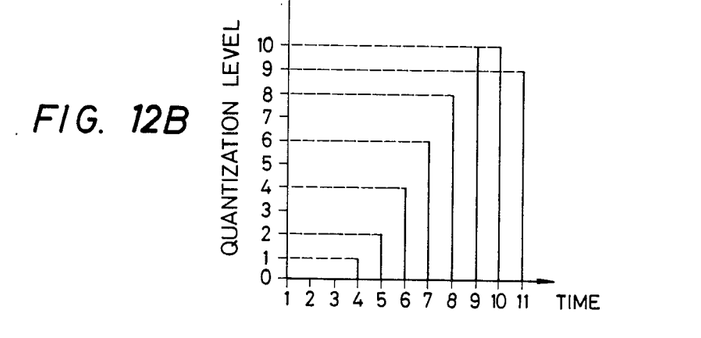
FIG. 12B illustrates the outputs of the adder of the embodiment of FIG. 11.

As shown in FIG. 12B, the number of bits in the data used for correcting the registration can be increased, but the frequency characteristics thereof are reduced because levels are averaged. This means that the waveform for correcting the registration has no sharp changes in shape and is smooth, and suits the intended purposes without raising any problems.

The output of the adder 100 is sequentially written into the second memory 101, and the writing frequency of the second memory is the same as the conversion frequency of the A/D converter. In other words, since sampling is done at a frequency corresponding to one scanning line, the number of data items in the vertical direction within the second memory is the same as the number of scanning lines. In this way, it is possible to obtain interpolation data which is smoothed in the vertical direction, based on data from the first memory 93 in the second memory 101.

After all the data has been collected in the second memory 101, a synchronizing signal is applied to an address generator 104 by a sync signal generator 105, address signals are generated in synchronism with the synchronizing signal, and, by inputting the addresses to the second memory 101, the data for correcting the registration is read out of the second memory 101 in synchronism with the television scanning. The method of reading out the data is the same as before. Referring to FIG. 7, data is read out in the horizontal direction i.e., $X_1Y_1, X_2Y_1 \ldots X_7Y_1$ along the first scanning line and $X_1Y_2, Y_2Y_2 \ldots X_7Y_2$ along the second scanning line, and is converted back into analog quantities by the D/A converter 102 to obtain a smooth correction waveform in the vertical direction. Since the data is sequentially arranged in a time series in the horizontal direction, interpolation is enabled by simply passing the data through a low-pass filter 103.

According to the present invention, an equivalent bit increase is enabled by the addition of an adder circuit, so that the density of lines scanned by a beam can change smoothly. As a result, the signal level changes naturally, reducing shading, thus making it possible to obtain an image of a superior quality. In addition, because an 8-bit A/D converter can be used as the A/D converter 98 of FIG. 11, instead of an expensive 12-bit one, the economic advantage of this invention is increased.

What is claimed is:

1. A circuit for generating a signal for correcting registration in a color television camera, comprising:
    first memory means having a plurality of horizontally- and vertically-arrayed storage locations for digitally storing a plurality of correction quantities corresponding to predetermined positions on a target scanned by an electron beam in an image pickup tube;
    digital-to-analog converter means for converting correction quantities read out from said first memory means into analog quantities to produce an analog signal;
    smoothing circuit means for smoothing the analog signal produced by said digital-to-analog converter means;
    analog-to-digital converter means for converting an output signal from said smoothing circuit means into a digital signal by sampling said output signal at a sampling frequency higher than a frequency at which correction quantities stored in vertically-arrayed storage locations of said first memory means are read out;
    adder means for adding together a group of sequential samples produced by said analog-to-digital converter means, each sequential sample of said group replaced by an immediately succeeding sequential sample each time said sequential samples are added together;
    second memory means for storing an output signal from said adder means;
    means for reading out said signal stored in said second memory means in synchronism with electron beam scanning of the target of said image pickup tube; and
    digital-to-analog converter means for converting said signal read out from said second memory means into an analog signal.

2. The circuit for generating a signal for correcting registration in a color television camera as claimed in claim 1, wherein said smoothing circuit means consists of a filter allowing low-frequency components of an input analog signal to pass therethrough.

3. A circuit for generating a signal for correcting registration in a color television camera, comprising:
    first memory means having a plurality of horizontally- and vertically-arrayed storage locations for digitally storing a plurality of correction quantities corresponding to predetermined positions on a target scanned by an electron beam in an image pickup tube;
    means for sequentially reading out correction quantities stored in vertically-arrayed storage locations of said first memory means;
    digital-to-analog converter means for converting said correction quantities read out from said first memory means into analog quantities to produce an analog signal;
    smoothing circuit means for smoothing the analog signal produced by said digital-to-analog converter means;
    analog-to-digital converter means for converting an output signal from said smoothing circuit means into a digital signal by sampling said output signal at a sampling frequency higher than a frequency at which said correction quantities stored in said vertically-arrayed storage locations of said first memory means are read out;
    adder means for adding together a group of sequential samples produced by said analog-to-digital converter means, each sequential sample of said group being replaced by an immediately succeeding sequential sample each time said sequential samples are added together;
    second memory means for storing an output signal from said adder means;
    means for reading out said signal stored in said second memory means in synchronism with electron beam scanning of the target of said image pickup tube; and
    digital-to-analog converter means for converting said signal read out from said second memory means into an analog signal.

4. The circuit for generating a signal for correcting registration in a color television camera as claimed in claim 3, wherein said smoothing circuit means consists of a filter allowing low-frequency components of an input analog signal to pass therethrough.

5. A circuit for generating a signal correcting registration in a color television camera, comprising:
first memory means having a plurality of horizontally- and vertically-arrayed storage locations for digitally storing a plurality of correction quantities corresponding to a plurality of horizontally- and vertically-arrayed intersections of imaginary horizontal and vertical lines which divide a target area scanned by an electron beam in an image pickup tube into sections;
means for sequentially reading out correction quantities stored in vertically-arrayed storage locations of said first memory means corresponding to vertically-arrayed intersections of said imaginary lines;
digital-to-analog converter means for converting said correction quantities read out from said first memory means into analog quantities to produce an analog signal;
smoothing circuit means for smoothing the analog signal produced by said digital-to-analog converter means;
analog-to-digital converter means for converting an output signal from said smoothing circuit means into a digital signal by sampling said output signal at a sampling frequency higher than a frequency at which said correction quantities stored in said vertically-arrayed storage locations of said first memory means corresponding to said vertically-arrayed intersections of said imaginary lines are read out;
adder means for adding together a group of sequential samples produced by said analog-to-digital converter means, each sequential sample of said group being replaced by an immediately succeeding sequential sample each time said sequential samples are added together;
second memory means for storing an output signal from said adder means;
means for reading out said signal stored in said second memory means in synchronism with electron beam scanning of the target area of said image pickup tube; and
digital-to-analog converter means for converting said signal read out from said second memory means into an analog signal.

6. The circuit for generating a signal for correcting registration in a color television camera as claimed in claim 5 wherein said smoothing circuit means consists of a filter allowing low-frequency components of an input analog signal to pass therethrough.

7. A circuit for generating a signal for correcting registration in a color television camera, comprising:
first memory means for digitally storing a plurality of correction quantities corresponding to predetermined positions on a target scanned by an electron beam in an image pickup tube;
digital-to-analog converter means for converting correction quantities read out from said first memory means into analog quantities to produce an analog signal;
smoothing circuit means for smoothing the analog signal produced by said digital-to-analog converter means;
analog-to-digital converter means for converting an output signal from said smoothing circuit means into a digital signal by sampling said output signal at a predetermined sampling frequency;
shift register means having a predetermined number of stages connected in series, a first stage of which is connected to successively receive sequential sample values produced by said analog-to-digital converter means, for shifting said sequential sample values from one stage to the next and for simultaneously outputting a predetermined number of said sequential sample values each time said sequential sample values are shifted;
adder means for adding together said predetermined number of said sequential sample values simultaneously output by said shift register means and for producing an output signal representing the sum of said predetermined number of said sequential sample values;
second memory means for storing the output signal from said adder means;
means for reading out said signal stored in said second memory means in synchronism with electron beam scanning of the target of the image pickup tube; and
digital-to-analog converter means for converting said signal read out from said second memory means into an analog signal.

8. The circuit for generating a signal for correcting registration in a color television camera as claimed in claim 7, wherein said sequential sample values successively received by said first stage consist of eight bits per sample value, said predetermined number of stages consists of four stages each capable of receiving and holding eight bits, and said adder means operates to add together four sample values and to produce an output signal consisting of ten bits per sample value.

9. The circuit for generating a signal for correcting registration in a color television camera as claimed in claim 7, wherein said sequential sample values successively received by said first stage consist of eight bits per sample value, said predetermined number of stages consists of sixteen stages each capable of receiving and holding eight bits, and said adder means operates to add together sixteen sample values and to produce an output signal consisting of twelve bits per sample value.

10. The circuit for generating a signal for correcting registration in a color television camera as claimed in claim 7, wherein said smoothing circuit means consists of a filter allowing low-frequency components of an input analog signal to pass therethrough.

11. A circuit for generating a signal for correcting registration in a color television camera, comprising:
first memory means for digitally storing a plurality of correction quantities corresponding to predetermined positions on a target scanned by an electron beam in an image pickup tube;
means for sequentially reading out said correction quantities stored in said first memory means;
digital-to-analog converter means for converting said correction quantities read out from said first memory means into analog quantities to produce an analog signal;
smoothing circuit means for smoothing the analog signal produced by said digital-to-analog converter means;
analog-to-digital converter means for converting an output signal from said smoothing circuit means into a digital signal by sampling said output signal at a sampling frequency higher than a frequency at which said correction quantities stored in said first memory means are read out;

shift register means having a predetermined number of stages connected in series, a first stage of which is connected to successively receive sequential sample values produced by said analog-to-digital converter means, for shifting said sequential sample values from one stage to the next and for simultaneously outputting a predetermined number of said sequential sample values each time said sequential sample values are shifted;

adder means for adding together said predetermined number of said sequential sample values simultaneously output by said shift register means and for producing an output signal representing the sum of said predetermined number of said sequential sample values;

second memory means for storing the output signal from said adder means;

means for reading out said signal stored in said second memory means in synchronism with electron beam scanning of the target of the image pickup tube; and digitial-to-analog converter means for converting said signal read out from said second memory means into an analog signal.

12. The circuit for generating a signal for correcting registration in a color television camera as claimed in claim 11, wherein said sequential sample values successively received by said first stage consist of eight bits per sample value, said predetermined number of stages consists of four stages each capable of receiving and holding eight bits, and said adder means operates to add together four sample values and to produce an output signal consisting of ten bits per sample value.

13. The circuit for generating a signal for correcting registration in a color television camera as claimed in claim 11, wherein said sequential sample values successively received by said first stage consist of eight bits per sample value, said predetermined number of stages consists of sixteen stages each capable of receiving and holding eight bits, and said adder means operates to add together sixteen sample values and to produce an output signal consisting of twelve bits per sample value.

14. The circuit for generating a signal for correcting registration in a color television camera as claimed in claim 11, wherein said smoothing circuit means consists of a filter allowing low-frequency components of an input analog signal to pass therethrough.

15. A circuit for generating a signal for correcting registration in a color television camera, comprising:

first memory means for digitally storing a plurality of correction quantities corresponding to intersections of imaginary horizontal and vertical lines which divide a target area scanned by an electron beam in an image pickup tube into sections;

means for sequentially reading out said correction quantities stored in said first memory means;

digital-to-analog converter means for converting said correction quantities read out from said first memory means into analog quantities to produce an analog signal;

smoothing circuit means for smoothing the analog signal produced by said digital-to-analog converter means;

analog-to-digital converter means for converting an output signal from said smoothing circuit means into a digital signal by sampling said output signal at a sampling frequency higher than a frequency at which said correction quantities stored in said first memory means are read out;

shift register means having a predetermined number of stages connected in series, a first stage of which is connected to successively receive sequential sample values produced by said analog-to-digital converter means, for shifting said sequential sample values from one stage to the next and for simultaneously outputting a predetermined number of said sequential sample values each time said sample values are shifted;

adder means for adding together said predetermined number of said sequential sample values simultaneously output by said shift register means and for producing an output signal representing the sum of said predetermined number of said sequential sample values;

second memory means for storing the output signal from said adder means;

means for reading out said signal stored in said second memory means in synchronism with electron beam scanning of the target of the image pickup tube; and digital-to-analog converter means for converting said signal read out from said second memory means into an analog signal.

16. The circuit for generating a signal for correcting registration in a color television camera as claimed in claim 15, wherein said sequential sample values successively received by said first stage consist of eight bits per sample value, said predetermined number of stages consists of four stages each capable of receiving and holding eight bits, and said adder means operates to add together four sample values and to produce an output signal consisting of ten bits per sample value.

17. The circuit for generating a signal for correcting registration in a color television camera as claimed in claim 15, wherein said sequential sample values successively received by said first stage consist of eight bits per sample value, said predetermined number of stages consists of sixteen stages each capable of receiving and holding eight bits, and said adder means operates to add together sixteen sample values and to produce an output signal consisting of twelve bits per sample value.

18. The circuit for generating a signal for correcting registration in a color television camera as claimed in claim 15, wherein said smoothing circuit means consists of a filter allowing low-frequency components of an input analog signal to pass therethrough.

* * * * *